United States Patent [19]

Schulte

[11] 4,211,299
[45] Jul. 8, 1980

[54] PARKING APPARATUS FOR LATERALLY SHIFTING A VEHICLE

[76] Inventor: Juergen Schulte, Herrlinghausen 56, 5632 Wermelskirchen 1, Fed. Rep. of Germany

[21] Appl. No.: 912,039

[22] Filed: Jun. 2, 1978

[30] Foreign Application Priority Data

Feb. 10, 1978 [DE] Fed. Rep. of Germany ....... 2805635

[51] Int. Cl.$^2$ .............................................. B60S 9/00
[52] U.S. Cl. ..................................... 180/200; 403/108
[58] Field of Search ................ 180/1 A, 1 AA, 1 AS, 180/1 AW, 200, 199; 280/482, 754, 761; 105/215 R, 215 C; 403/108, 378, 31

[56] References Cited

U.S. PATENT DOCUMENTS

| 1,609,044 | 11/1926 | Williams | 180/1 A |
| 1,742,636 | 1/1930 | Collins | 180/1 A |
| 2,020,489 | 11/1935 | Walker | 280/754 |
| 2,247,009 | 6/1941 | Auerill | 280/754 |
| 2,706,009 | 4/1955 | Schramm | 403/108 |
| 2,764,249 | 9/1956 | Paolucci | 180/1 A |
| 3,032,353 | 5/1962 | Williams et al. | 280/482 |

FOREIGN PATENT DOCUMENTS

2402990 7/1975 Fed. Rep. of Germany .......... 180/1 A

Primary Examiner—John J. Love
Assistant Examiner—Randall A. Schrecengost
Attorney, Agent, or Firm—W. G. Fasse; D. F. Gould

[57] ABSTRACT

A parking apparatus is used for enabling the driver to move the rear end of a vehicle laterally out of a row of vehicles into a parking spot. For this purpose the vehicle is equipped with a lifting mechanism on auxiliary wheels so arranged that the rear end of the vehicle may be lifted off the ground with its ordinary wheels. The engine power may be used for this lifting of the vehicle. Once the ordinary rear wheels are off the ground the vehicle may be shifted in a direction extending substantially perpendicularly to its longitudinal axis without maneuvering as is normally required for so-called parallel parking between two vehicles spaced from each other longitudinally. The front wheels would be sharply turned in the direction toward the parking spot.

9 Claims, 5 Drawing Figures

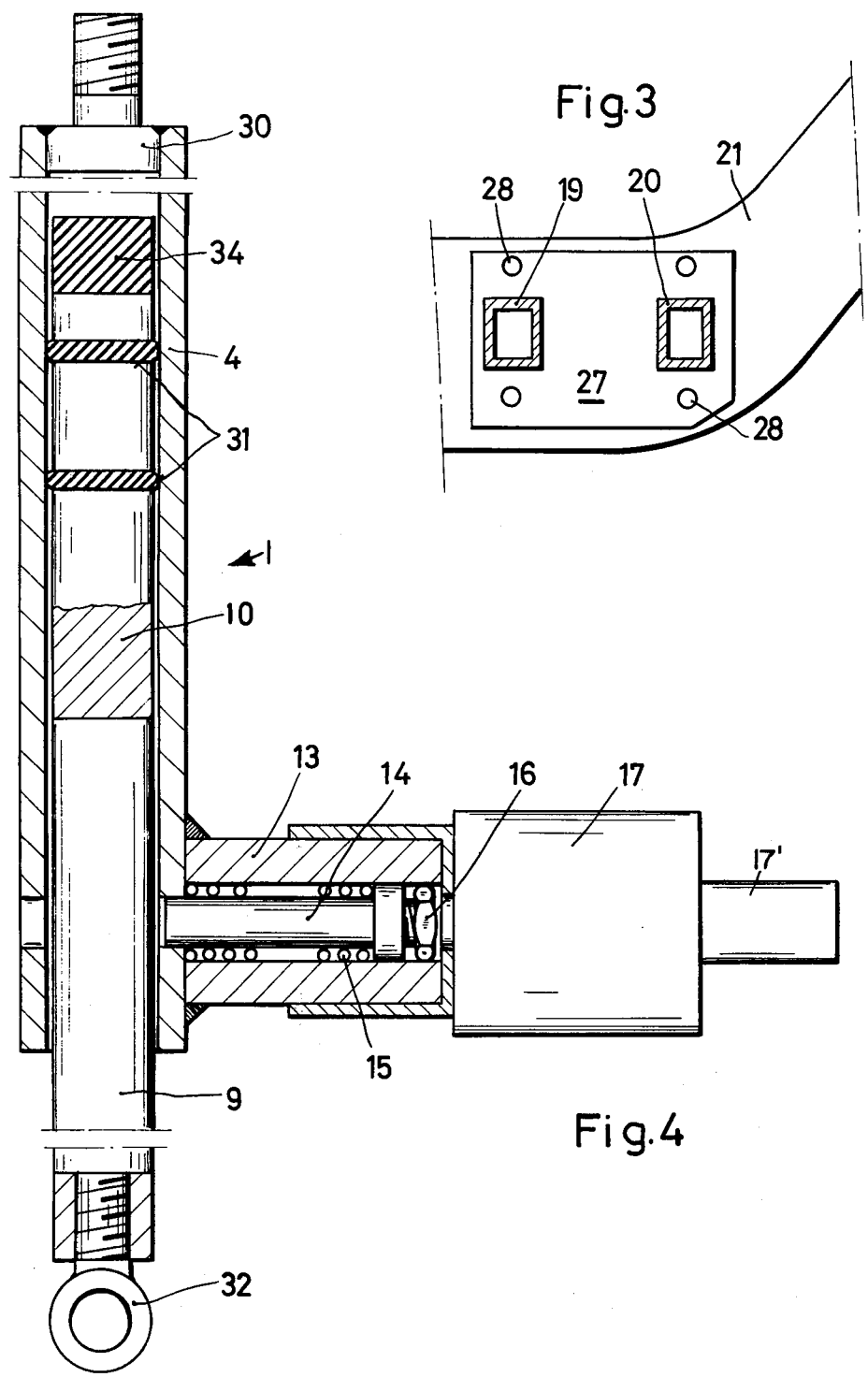

PARKING APPARATUS FOR LATERALLY SHIFTING A VEHICLE

BACKGROUND OF THE INVENTION

The present invention relates to a parking apparatus for laterally shifting a vehicle into a parking spot.

Such devices comprise a cross-piece secured in the area of the rear axle. Auxiliary wheels are secured to each end of the cross-piece. The auxiliary wheels are oriented in a direction perpendicularly to the longitudinal axis of the vehicle. One end of the cross-piece is secured to a tilting arm which in turn connects the cross-piece to the structure of the vehicle in a tiltable manner. The other end of the cross-piece is tiltably connected to a piston cylinder drive in such a manner that the tilting arm and the piston cylinder arrangement cross each other when the auxiliary wheels are lowered for lifting the vehicle.

An apparatus of the just described kind is disclosed in German Pat. No. 2,402,990. With regard to the relevant prior art, reference is expressly made to the printed publications listed in said German Pat. No. 2,402,990.

In the known apparatus, as disclosed in said German Pat. No. 2,402,990, the upper ends of the tilting arm and of the piston cylinder drive are secured to the rear axle housing to the right and left of the differential gear housing. This type of arrangement is satisfactory in many instances. However, due to the additional masses which are not spring buffered there is a possibility that the parking apparatus influences the driving characteristics of the vehicle in which the parking apparatus is installed.

OBJECTS OF THE INVENTION

In view of the above it is the aim of the invention to achieve the following objects singly or in combination:

to avoid the drawbacks of the prior art, more specifically, to construct the parking apparatus in such a manner that it is integrated into the spring system of the vehicle;

to provide a parking apparatus which will permit arresting the rear wheels of the vehicle when the parking apparatus is brought into its operating position thereby preventing the normal vehicle wheels from being moved downwardly when the auxiliary wheels engage the ground;

to prevent that the weight of the rear wheels of the vehicle load the rear springs of the vehicle when the rear wheels are off the ground; and to construct the parking apparatus as rigidly as possible while simultaneously avoiding increasing the total weight of the vehicle in an unnecessary manner.

SUMMARY OF THE INVENTION

According to the invention there is provided a parking apparatus of a type described above which is characterized in that the support means for the journals at the upper end of the tilting arm and at the upper end of the piston cylinder drive are operatively secured to transverse frame means which in turn extend substantially at right angles relative to the longitudinally extending frame members of the vehicle frame.

The transverse frame members are arranged in the area of the rear floating axle means. Further, arresting means are mechanically connected in parallel to each shock absorber of the two rear floating axles.

Preferably, the arresting means comprise a pipe and a rod axially movable in the pipe as well as locking means movable in the radial direction, that is, substantially at right angles relative to the longitudinal axis of the rod and pipe through a hole in the pipe and into a hole in the rod. The locking means include a locking bolt which is movable into the arresting position by mechanical means, such as a piston cylinder drive of the pneumatic or hydraulic type, or it may be movable by the armature of an electromagnet. In addition, a spring biases the locking bolt into the retracted inoperative position. Preferably, the hole in the rod has a longitudinal configuration extending in the direction of the longitudinal axis of the rod.

The just described features have the advantage that the mass of the parking apparatus is integrated into the spring system of the vehicle, thereby preventing the sagging of the rear wheels when the latter are lifted off the ground during the use of the parking mechanism.

BRIEF FIGURE DESCRIPTION

In order that the invention may be clearly understood, it will now be described, by way of example, with reference to the accompanying drawings, wherein:

FIG. 3 is a sectional view along section line 33 in FIG. 2;

FIG. 4 is a longitudinal section through the arresting means; and

DETAILED DESCRIPTION OF PREFERRED EXAMPLE EMBODIMENTS

Figure 1:
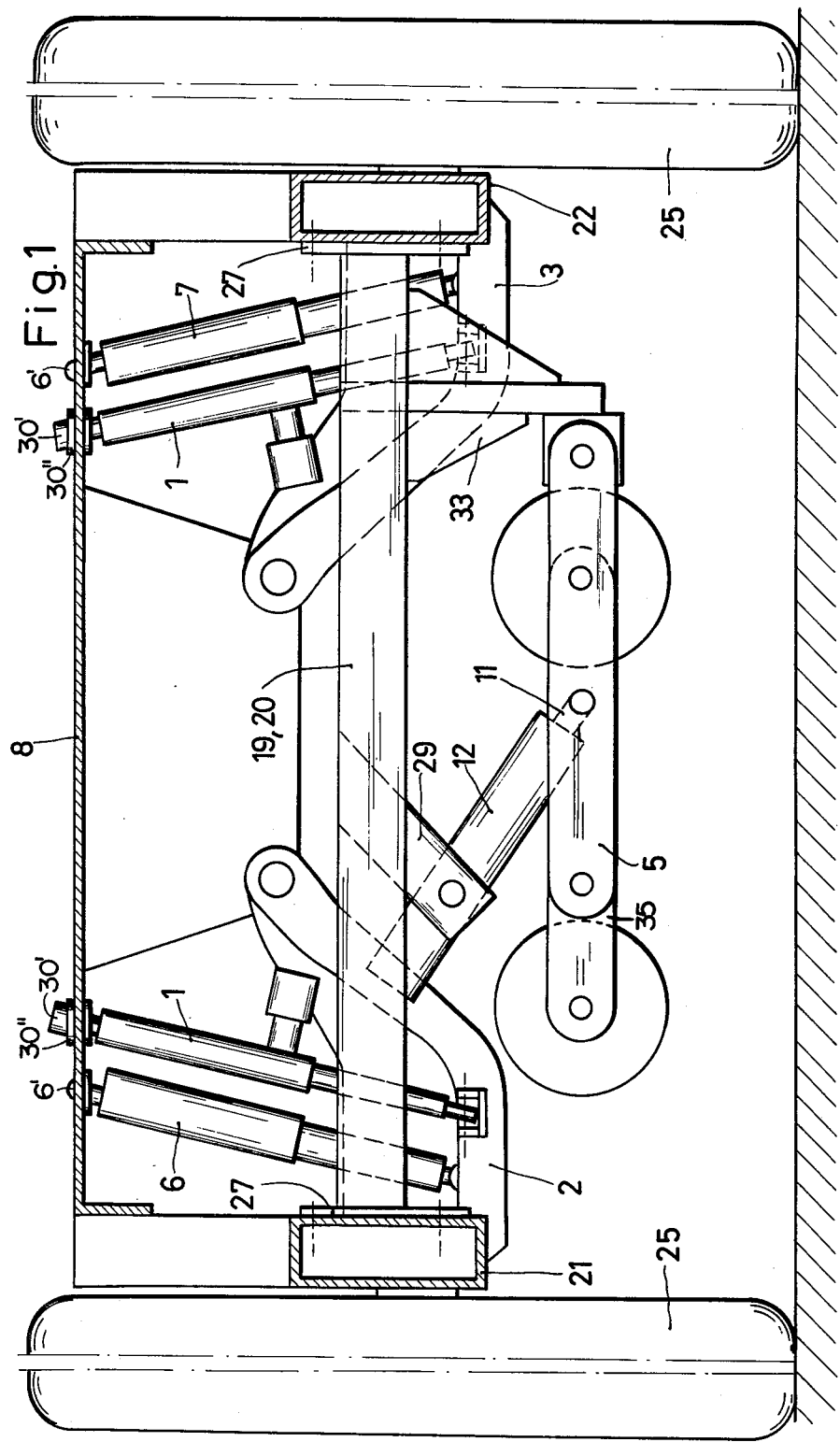
FIG. 1 shows a rear view of the vehicle in the longitudinal direction of the vehicle thereby illustrating the transverse frame means and the parking apparatus in its lifted rest position and also showing the arresting mechanism according to the invention.
Figure 2:
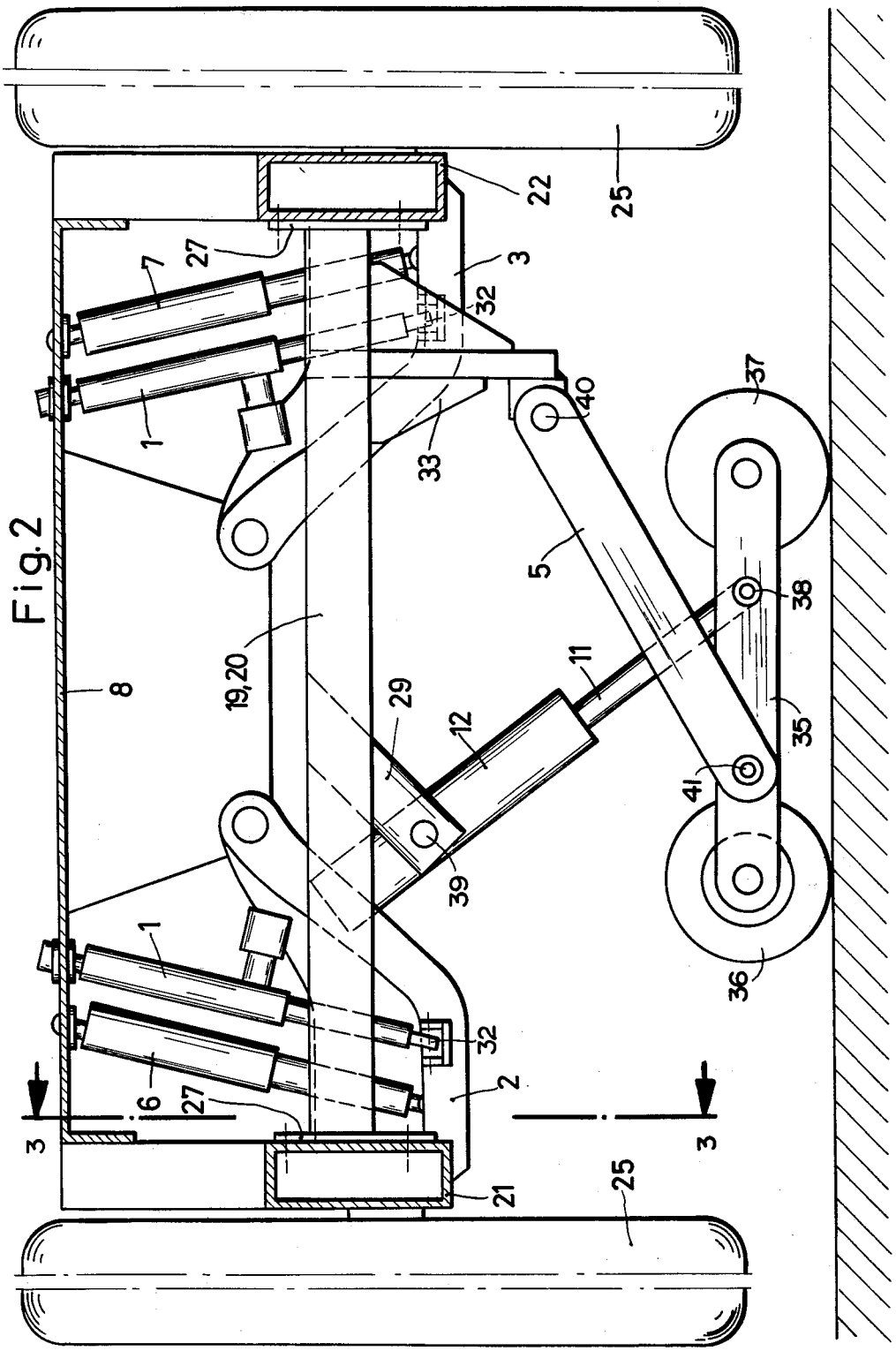
FIG. 2 is a view similar to that of FIG. 1, however showing the parking mechanism in its extended, vehicle lifting position.

The locking mechanism 1 for each floating axle 2, 3 comprises a pipe 4 with a screw member 30 welded into the pipe 4. As shown in FIGS. 1 and 2, the screw end 30 of the arresting mechanism 1 is secured to the chassis bottom 8 as illustrated at 30'. The securing point 30' is located as close as possible to the securing point 6' of the shock absorber means 6, 7. Rubber washers 30" are preferably used in the connection of the upper end of the arresting mechanism 1 to the chassis 8. Inside the pipe 4 a rod 10 is axially movable guided by guide rings 31 such as O-rings made of rubber or neoprene or the like. The rod 10 is provided with a hole 9 having a longitudinal configuration and extending radially, that is, substantially at right angles relative to the longitudinal axis of the rod 10 centrally through the rod. A journal or pivot eye 32 is secured to the lower end of the rod 10 by a threading or the like. The above mentioned O-rings 31 substantially improve the guiding of the rod 10 in the pipe 4 when the vehicle is driven.

Referring to FIG. 4, a bushing 13 is secured, for example, by welding to the pipe 4. An arresting bolt 14 is axially movable back and forth in the bushing 13 in a direction extending substantially perpendicularly to the longitudinal axis of the arresting mechanism 1. A spring 15 is biassed between the outer wall of the pipe 4 and an adjustable end piece 16, whereby the biassing of the spring 15 may be adjusted. The spring makes sure that the arresting bolt 14 is kept in its rest position shown in FIG. 4 when no force is applied to the bolt 14. In this rest position the bolt may slightly extend into a respective aperture in the pipe 4 but it does not extend into the longitudinal hole 9 in the rod 10.

An operating mechanism 17 for the locking bolt 14 is mechanically connected to the locking bolt 14 for moving the latter against the biassing force of the spring 15 through the hole 9 in the rod 10, whereby the movability of the floating axles 2 and 3 is locked. Preferably, the operating mechanism 17 comprises an electromagnet which may be operated through the car battery by means not shown. The armature of the operating mechanism 17 is operatively arranged for driving the locking bolt 14 into the hole 9 in the rod 10. Instead, or in addition, a hydraulic or pneumatic piston cylinder device 17' may be used for driving the locking bolt 14 into the arresting position. The piston cylinder arrangement 17' would be connected to a conventional source of hydraulic or pneumatic pressure. The armature of the operating electromagnet 17 would be directly connected to the bolt 14. Similarly, the bolt 14 would be connected to the piston rod of the piston cylinder arrangement 17'. If desired, the armature could simultaneously constitute the piston rod so that the operation of the locking bolt 14 could be effected with the power most conveniently available.

In operation, the operating mechanism 17 is actuated at the same time with the actuation of the parking mechanism 18 when the rear end of the vehicle is lifted so that the rear wheels 25 are securely locked to the chassis of the vehicle. Thus, the wheels are prevented from sagging as the vehicle rear end is lifted. After the parking mechanism 18 has served its purpose in the conventional manner, the operating mechanism 17 is switched off so that the force of the spring 15 retracts the locking bolt 14 out of the hole 9 in the rod 10 back into the rest position.

Incidentally, the upper end of the rod 10 may be provided with a buffer 34 such as a rubber buffer or spring, whereby the movement of the rod 10 against the screw head 30 is cushioned.

Figure 5:
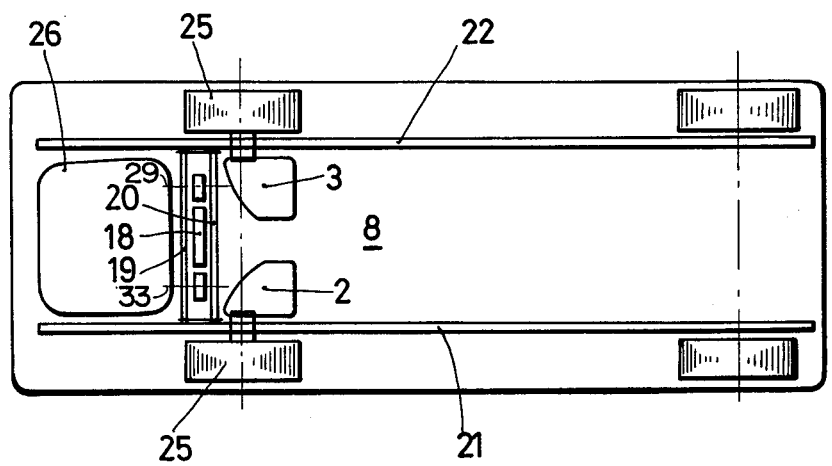
FIG. 5 is a somewhat schematic view against the bottom of the vehicle thereby illustrating the arrangement of the parking mechanism between two transverse frame members having a substantially rectangular cross-section.

FIG. 5 shows a schematic bottom view of a vehicle equipped according to the invention with a parking mechanism 18 which is arranged and secured advantageously between two frame members 19 and 20 constituting transverse frame elements which may be welded at their ends to the longitudinal frame members 21 and 22 adjacent to the rear axle so that the arresting mechanism 18 is substantially positioned intermediate the two floating rear axles 2 and 3 of the rear wheels 25 on the one hand, and the tank 26 of the vehicle on the other hand. This type of arrangement results in an especially rigid securing and in an especially rigid structure which is relatively lightweight. Morever, a symmetric force distribution is accomplished due to the arrangement of the tilting arm 5, the securing means 33 and the piston cylinder means 11, 12 as well as the respective securing means 29, centrally between the two transverse frame members 19 and 20. The securing may be accomplished by conventional welding or by screw means not shown. The stability of the entire parking mechanism is thus improved while simultaneously avoiding that the parking mechanism affects the driving characteristics of the vehicle. Further, this type of structure is more durable, more secure, and more rigid than prior art devices in which the parking mechanism is secured to the rear axle housing by means of clamps or the like. Incidentally, FIG. 3 shows the securing of the transverse frame members 19 and 20 to the longitudinal frame members 21 by means of a plate 27 which may be welded to the ends of the bars 19 and 20. The plate 27 in turn may be secured by screws 28 to the frame member 21. This type of structure has the advantage that the present parking mechanism is easily installed in any type of vehicle even as a subsequently acquired equipment. However, the present structure may of course also be installed in new vehicles with the same ease.

In view of the above it will be appreciated that the tilting arm 5 and the piston cylinder drive 11 and 12 are secured with their upper ends to the holding members 29, 33 for tilting in the vertical direction about the pivot points 39 and 40. The holding members 29, 33 are secured between the two horizontal frame members 19, 20, for example, by welding or the like. Further, the tilting arm 5 is journalled at 41 to the cross-piece 35. For this purpose the tilting arm 5 may have a forked end if desired. Similarly, the cross-piece 35 may have forked ends for holding the wheels 36 and 37 as shown in FIG. 2. It will be noted that the journal or pivot point 41 is located off center of the cross-piece 35. Similarly, the outer end of the piston rod 11 is secured off center to the cross-piece 35 in a pivotable manner as shown at 38 in FIG. 2. The piston rod 11 is laterally displaced relative to the tilting arm 5 so that these two elements do not interfere with each other. The piston cylinder arrangement 11, 12 may be driven hydraulically or pneumatically from a source of pressure not shown but readily driven by the vehicle engine for lifting the rear end of the vehicle.

Although the invention has been described with reference to specific example embodiments, it will be appreciated, that it is intended, to cover all modifications and equivalents within the scope of the appended claims.

What is claimed is:

1. An apparatus for shifting an automobile substantially at right angles relative to its longitudinal axis, especially for parking a vehicle having chassis means, floating rear axle means and longitudinally extending frame members as well as shock absorber means arranged between said chassis means and said floating rear axle means for cooperation with said floating rear axle means, comprising cross-piece means (35), auxiliary wheel means (36, 37) rotatably secured to said cross-piece means and oriented substantially at right angles to said longitudinal vehicle axis, transverse frame means (19, 20) rigidly secured to said frame members adjacent said rear axle means, support means for securing said cross-piece means to said transverse frame means, said support means comprising piston cylinder means, first journalling means tiltably securing said piston cylinder means to said transverse frame means and to said cross-piece means, second journalling means tiltably securing said cross-piece means to said transverse frame means, said piston cylinder means and said second journalling means being arranged to cross each other when said auxiliary wheels are lowered, said apparatus further comprising arresting means operatively connected in parallel to each shock absorber means between said chassis means and said floating rear axle means for temporarily neutralizing the function of said floating rear axle means and said shock absorber means when the latter are relieved of their normal load, said arresting means comprising pipe means, rod means operatively inserted in said pipe means for relative axial movement between said pipe means and said rod means, locking means including bolt means extending movable to extend through said pipe means and said rod means, said locking means comprising bushing means secured to said pipe means, said locking bolt means extending through said bushing means, hole means in said pipe means and in said rod means for cooperation with said locking bolt means in its locking position, and operating means connected to said locking bolt means for moving said locking bolt means into and out of a locking position relative to said pipe means and relative to said rod means.

2. The apparatus of claim 1, wherein said locking bolt means comprise spring means cooperating with said locking bolt means for keeping the latter in a withdrawn position in which the locking bolt means is disengaged from said pipe means and from said rod means.

3. The apparatus of claim 2, wherein said operating means for said locking bolt means comprise electromagnet means arranged for moving said locking bolt means.

4. The apparatus of claim 2, wherein said operating means for said locking bolt means comprise piston cylinder means arranged for moving said locking bolt means.

5. The apparatus of claim 2, wherein said operating means for said locking bolt means comprise spring means biasing said locking bolt means into a withdrawn rest position, and drive means for moving said locking bolt means into said locking position, whereby the spring means return the locking bolt means into the rest position when said drive means are switched off.

6. The apparatus of claim 2, further comprising guide ring means operatively arranged between said rod means and said pipe means whereby the rod means are movably guided for axial movement in said pipe means.

7. The apparatus of claim 2, further comprising buffer means operatively connected to one end of said rod means for buffering relative movement betwen said rod means and said pipe means.

8. The apparatus of claim 7, wherein said buffer means comprise a rubber cushion located at the upper end of said rod means inside said pipe means.

9. The apparatus of claim 1, wherein said transverse frame means comprise two pipes having a substantially rectangular cross-section arranged in parallel to each other, said support means being arranged between said two pipes and operatively conntected to said two pipes.

* * * * *